UNITED STATES PATENT OFFICE.

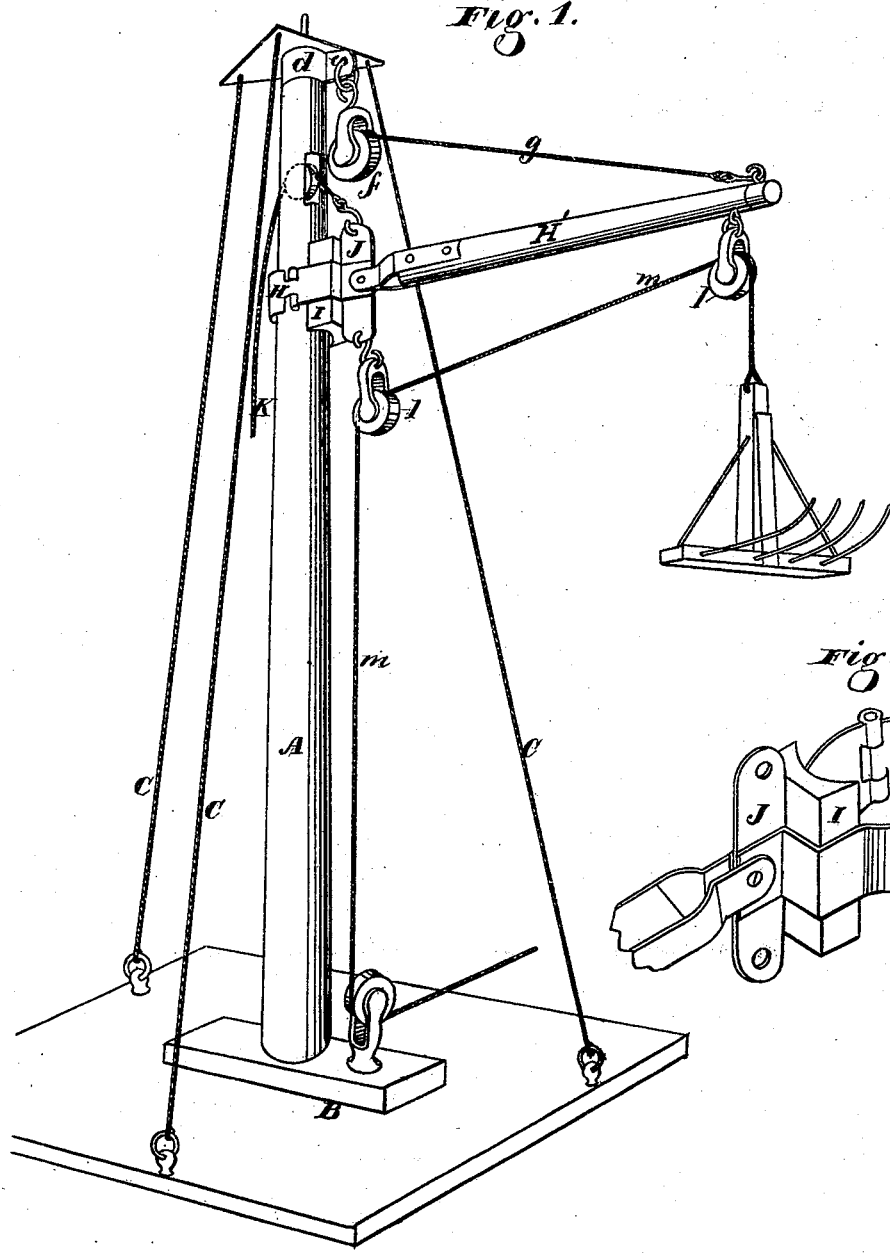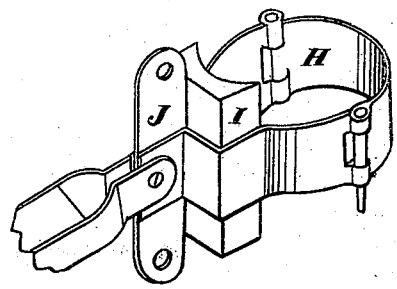

JOHN Q. GRINNELL, OF STOCKTON, CALIFORNIA.

IMPROVEMENT IN FIELD-DERRICKS.

Specification forming part of Letters Patent No. 180,223, dated July 25, 1876; application filed May 23, 1876.

*To all whom it may concern:*

Be it known that I, JOHN Q. GRINNELL, of Stockton, San Joaquin county, State of California, have invented certain new and useful Improvements in Field-Derricks; and I do hereby declare the following description and accompanying drawings are sufficient to enable any person skilled in the art or science to which it most nearly appertains to make and use my said invention without further invention or experiment.

My invention relates more particularly to such derricks as are for handling hay and grain in the harvest-field.

My improvements in such derricks consist in the employment of a novel hoop for attaching the boom to the derrick and detaching it therefrom, when desired; and also in the arrangement for connecting or hinging the boom to said hoop, whereby I obtain an independent motion of the boom; and also in the method of attaching the hoisting-pulleys and elevating-rope, all as more fully described below.

Referring to the accompanying drawing, Figure 1 is a perspective view of my device. Fig. 2 is an enlarged view of a portion of the machine.

Let A represent the mast, which is supported upon the base B, and stayed in a vertical position by means of the guy-ropes c c c.

The ferrule d, which surrounds the upper end of the mast, I form with an ear or projection, e, and from this ear or projection I suspend the pulley f, over which the rope g, which raises and lowers the outer end of the boom, passes.

The hoop H, which surrounds the mast, and to which the boom H' is attached, I construct in two parts. These parts I unite together on one side of the mast by a hinge or joint, and when the parts are placed around the mast, I fasten the opposite edges together with a pin or other fastening, so that the hoop can be removed entirely from the mast by removing the pin and opening out the two parts, when it is desired to detach the boom from the mast.

The shoe I, which rides upon the mast, is secured to one part of the hoop H, as represented, and to the side of this shoe, opposite the mast, I secure a vertical bar or plate, J, which is long enough to extend above and below the shoe at each end. The inner end of the boom I secure to the middle of this plate, opposite the middle of the shoe, by a suitable fastening, so as to form a vertically-moving joint or hinge, so that the boom can be raised or lowered about this hinge or joint as a center.

The hoop H I make large enough to allow it to slide freely up and down along the mast, a rope, K, being secured to the upper projecting end of the plate J; thence passing up over a sheave on the upper end of the mast; and thence down to the ground, by which the boom and hoop can be raised and lowered to any point in the length of the mast.

The pulley l, over which the hoisting-rope m, that operates the hay-fork, passes, I suspend from the lower projecting end of the plate J, so that everything is elevated simultaneously when the hoop is drawn upward.

By this arrangement I provide a very simple and convenient arrangement of the derrick, whereby I adapt it for elevating hay and grain in the field.

By combining the loose hoop and the arrangement for elevating it with the hinged boom, I can use a much shorter boom than is ordinarily used, and therefore can handle it with much greater ease. As the stack increases in height the hoop is elevated accordingly, so as to keep the boom in the proper relative position to insure speed and convenience in lifting and depositing the grain on the stack. It also enables me to build a stack as much higher than the mast as the boom will project above it when the loop is elevated to the highest point.

Having described my invention, what I claim is—

1. The hoop H, when formed in two parts, which are hinged together on one side of the mast, and fastened together by a removable fastening on the opposite side, in combination with the mast A and boom H', substantially as and for purposes described.

2. The hoop H, with its shoe I and upright plate J, in combination with the boom H', which is connected with the plate J by a hinge-joint, substantially as above specified.

3. In combination with the shoe I and hoop H of a derrick-boom, the upright plate J, having the hoisting-rope K secured to its upper end, and the pulley l secured to its lower end, substantially as and for the purpose described.

In witness whereof I have hereunto set my hand and seal.

JOHN Q. GRINNELL. [L. S.]

Witnesses:
 GEO. H. STRONG,
 CHAS. G. PAGE.